(12) United States Patent
Frish et al.

(10) Patent No.: US 6,496,616 B2
(45) Date of Patent: *Dec. 17, 2002

(54) MINIATURE MONOLITHIC OPTICAL DEMULTIPLEXER

(75) Inventors: Michael B. Frish, Andover, MA (US);
Philip B. Keating, Salem, MA (US);
William J. Kessler, Groton, MA (US);
Steven J. Davis, Londonderry, NH (US)

(73) Assignee: Confluent Photonics, Inc., Andover, MA (US)

( * ) Notice: Subject to any disclaimer, the term of this patent is extended or adjusted under 35 U.S.C. 154(b) by 9 days.

This patent is subject to a terminal disclaimer.

(21) Appl. No.: 09/805,358

(22) Filed: Mar. 13, 2001

(65) Prior Publication Data

US 2001/0031112 A1 Oct. 18, 2001

Related U.S. Application Data

(63) Continuation-in-part of application No. 09/633,934, filed on Aug. 8, 2000, now Pat. No. 6,434,291.
(60) Provisional application No. 60/226,052, filed on Aug. 16, 2000, and provisional application No. 60/200,189, filed on Apr. 28, 2000.

(51) Int. Cl.[7] .................................................. G02B 6/28
(52) U.S. Cl. .......................... 385/24; 385/10; 385/36; 385/37; 359/130; 359/131
(58) Field of Search ........................... 385/15, 16, 18, 385/24, 27, 28, 31, 36, 37, 10; 359/124, 125, 128, 131, 133, 130

(56) References Cited

U.S. PATENT DOCUMENTS

| | | | |
|---|---|---|---|
| 4,825,262 A | 4/1989 | Mallinson | 356/352 |
| 4,859,017 A | 8/1989 | Brierley et al. | 350/96.15 |
| 5,500,761 A | 3/1996 | Goossen et al. | 359/290 |
| 5,524,012 A | 6/1996 | Wang et al. | 372/23 |
| 5,589,974 A | 12/1996 | Goossen et al. | 359/290 |
| 5,636,052 A | 6/1997 | Arney et al. | 359/291 |
| 5,640,479 A | 6/1997 | Hegg et al. | 385/120 |
| 5,654,819 A | 8/1997 | Goosen et al. | 359/291 |
| 5,659,418 A | 8/1997 | Yurke | 359/290 |
| 5,684,631 A | 11/1997 | Greywall | 359/565 |
| 5,751,469 A | 5/1998 | Arney et al. | 359/291 |
| 5,774,604 A | 6/1998 | McDonald | 385/18 |
| 5,777,763 A | 7/1998 | Tomlinson, III | 359/130 |
| 5,786,925 A | 7/1998 | Goossen et al. | 359/245 |
| 5,825,528 A | 10/1998 | Goossen | 359/291 |
| 5,838,847 A | 11/1998 | Pan et al. | 385/18 |
| 5,872,880 A | 2/1999 | Maynard | 385/88 |
| 5,887,090 A | 3/1999 | Rudolph et al. | 385/24 |
| 5,936,752 A | 8/1999 | Bishop et al. | 359/124 |
| 5,960,132 A | 9/1999 | Lin | 385/18 |
| 5,960,133 A | 9/1999 | Tomlinson | 385/18 |
| 5,963,350 A | 10/1999 | Hill | 359/127 |
| 6,002,513 A | 12/1999 | Goossen et al. | 359/291 |
| 6,011,884 A | 1/2000 | Dueck et al. | 385/24 |
| 6,011,885 A | 1/2000 | Dempewolf et al. | 385/34 |
| 6,031,946 A * | 2/2000 | Bergmann et al. | 385/18 |

FOREIGN PATENT DOCUMENTS

WO 99/31532 6/1999

* cited by examiner

*Primary Examiner*—Phan T. H. Palmer
(74) *Attorney, Agent, or Firm*—Testa, Hurwitz & Thibeault, LLP

(57) ABSTRACT

A miniature monolithic optical demultiplexer that comprises a dispersive optical element and a wavelength filter array. The miniature monolithic optical DWDM demultiplexer can be fabricated using micro- and nano-scale techniques common to the semiconductor industry. The operating principles and some characteristics of the DWDM demultiplexer are described. The device will be useful in the field of optical communication as a component within networks that perform all of the necessary switching, adding, dropping, and manipulating of optical signals entirely in the optical domain. With the inclusion of additional components, exemplary optical communication devices that can be built using the DWDM demultiplexer include optical add/drop multiplexers (OADM), Dense Wavelength Division Multiplexing (DWDM) routers, tunable filters, optical cross connects, and the like.

27 Claims, 6 Drawing Sheets

460

MINIATURE MONOLITHIC OPTICAL DEMULTIPLEXER

CROSS-REFERENCE TO RELATED APPLICATIONS

This application claims the benefit of U.S. Provisional Patent Application Ser. No. 60/200,189, filed Apr. 28, 2000, and of U.S. Provisional Patent Application Ser. No. 60/226,052, filed Aug. 16, 2000, and is a continuation-in-part of U.S. patent application Ser. No. 09/633,934, filed Aug. 8, 2000 now U.S. Pat. No. 6,434,291, which applications are incorporated herein in their entirety by reference.

FIELD OF THE INVENTION

This invention relates generally to optical communication systems and components. More particularly, the invention relates to optical systems comprising micro- and nano-scale optical structures and components built from and upon monolithic substrates.

BACKGROUND OF THE INVENTION

In the field of telecommunication, it is recognized that optical communication components and systems, which use light waves and beams to carry information, offer many considerable advantages over conventional copper wire-based communication systems that carry information in the form of electrical signals. One advantage is the significantly greater amount of information that can be carried by a physical connection employing a single fiber optic strand as compared to a copper wire circuit.

To optimize the amount of information that can be transmitted along a single optical fiber, the technique known as Dense Wavelength Division Multiplexing (DWDM) is now being implemented. The use of DWDM is accelerating at a rapid pace, due to the development of essential network components such as optical fiber, infrared laser transmitters, fiber amplifiers, and the like. However, the rate of growth of DWDM networks is currently limited in part by the availability of low-cost mass produced components that provide acceptable reliability and resistance to environmental effects, such as, vibration, mechanical stresses, and temperature fluctuations.

In these optical telecommunications systems, information is transmitted in the form of infrared light signals that originate at laser sources. Each laser source is tuned to emit an infrared light beam comprising a narrow band of wavelengths (or, equivalently, frequencies) centered at a primary frequency. As used herein, the word "color" describes a characteristic band of wavelengths centered around a specific primary wavelength as emitted by a telecommunications laser. Information is encoded in each infrared beam by temporally modulating the laser power. Each primary frequency corresponds to a value specified by the standard International Telecommunication Union (ITU) grid. The ITU standard specifies transmission frequencies that are spaced at 100 GHz intervals, although a reduction to 50 or 25 GHz is anticipated as the technology evolves.

In DWDM, many distinct colors of infrared light may be transmitted simultaneously along a single optical fiber, each color carrying information that is distinct from information carried by other colors. Devices called multiplexers physically superimpose the light beams from several colors thereby creating multi-color light beams wherein each color carries its encoded information. The combined information is transmitted some distance. At a terminus of the transmission path, demultiplexers physically separate or disperse the multiple colors received from a single optical fiber onto multiple output fibers, each output fiber carrying a single color, thereby permitting the information carried by each color to be directed to its intended destination.

The ideal demultiplexer will direct all of the incoming light of each color onto its corresponding output optical fiber. However, in actual demultiplexer devices the color separation is generally imperfect—not all of the light of each color entering the demultiplexer is transmitted into each respective output beam, and a portion of the light from each color is transmitted into the paths of neighboring beams. This leakage causes undesirable performance effects such as crosstalk and insertion loss that must be limited in magnitude for the device to be practical.

At present, demultiplexing is often accomplished utilizing devices based upon either diffraction gratings or precision interference filters. Neither type of device is amenable to cost-effective mass production while maintaining acceptable performance.

For filter-based demultiplexers, such as those described in T. E. Stern, K. Bola, Multiwavelength Optical Networks, A Layered Approach, Addison Wesley, 1999, each filter must be manufactured separately from the others using multilayer vapor deposition techniques. The filters are then installed manually or robotically in an optical substrate and aligned to project light onto individual output optical fibers. Achieving and maintaining optical alignment in spite of thermal and mechanical stresses confounds attempts to reliably mass produce these devices, adding to the production cost and diminishing long-term reliability and resistance to environmental influences. Furthermore, the filters are frequently operated in a serial configuration, such that one color is transmitted through one filter while all other colors are reflected to the next, and so on. In this configuration, the insertion loss accumulates so that the last transmitted color has significantly higher loss than earlier colors.

Grating-based devices offer the advantage of being parallel rather than serial demultiplexers, and therefore have improved insertion loss uniformity. However, to achieve acceptable crosstalk, the optical components within grating-based devices must be several centimeters in size. Therefore, like filter-based devices, grating-based demultiplexers are difficult to align and maintain aligned. Low-cost mass production of reliable devices remains elusively difficult.

Recently, demultiplexers based on arrayed waveguide gratings (AWGs) have been introduced commercially. These small, thin monolithic devices, generally fabricated from silicon-based or InP-based wafer substrates, offer promise as low-cost components that can be mass produced. Nevertheless, despite more than a decade of intense development of AWG technology, and the emergence of several companies offering AWG products, the performance specifications achieved by production AWGs remain several orders of magnitude worse than theoretical predictions.

Monolithic demultiplexer devices based on waveguide gratings etched into wafers of semiconductor materials such as InP have been described in recent patent and technical literature. These devices also offer potential as low-cost mass-producible components but, like AWGs, have not yet achieved acceptable performance specifications. In particular, etched waveguide gratings demonstrated to date suffer from excessive crosstalk due to the small size and imperfections in fabrication of the grating structure.

SUMMARY OF THE INVENTION

The invention, in one embodiment, provides a miniature monolithic optical wavelength demultiplexer comprising an assembly of optical components built on a monolithic platform.

In one aspect, the invention relates to a miniature monolithic optical demultiplexer that includes a wavelength dispersing optical element that receives a multi-color light beam and separates the light spatially, providing a plurality of substantially single color optical beams, each substantially single color optical beam containing primarily a single color different from that of the other substantially single color optical beams. In some embodiments, a small portion of the light from other colors can remain in a substantially single-color optical beam after passing through the wavelength dispersing optical element. The demultiplexer also includes a wavelength filter array having at least one wavelength filter element. Each wavelength filter element receives one of the plurality of substantially single color optical beams and removes therefrom the portions of light from colors other than the primary color of that beam, thereby providing a purified single color output beam substantially free of light from other colors.

In some embodiments, one or more of the substrate, the wavelength dispersive optical element, and the wavelength filter array comprises at least one material selected from the group consisting of silicon, silicon monoxide, silicon dioxide, silicon-germanium alloys, silicon carbide, silicon nitride, and indium phosphide. In other embodiments, different materials can be employed. In one embodiment, the demultiplexer is preferably made from materials that are amenable to semiconductor fabrication processes.

In one embodiment, at least one of the wavelength dispersive optical element and the wavelength filter array elements comprises an optical waveguide. In one embodiment, at least one of the wavelength dispersive optical element and the wavelength filter array elements comprises a miniature free-space optical element. With regard to the invention, the term "free-space" refers to optical systems or components in which light travels in a fluid, such as air, or in a vacuum, rather than through a solid waveguide material.

In some embodiments, the demultiplexer can further comprise an input optical structure that receives the input beam. The input optical structure can comprise at least one material selected from the group consisting of silicon, silicon monoxide, silicon dioxide, silicon-germanium alloys, silicon carbide, silicon nitride, and indium phosphide. The input optical structure can comprise an optical waveguide, or a miniature free-space optical element. In some embodiments, the miniature monolithic optical demultiplexer further comprises an optical waveguide that communicates the input beam from an external source.

In some embodiments, the demulitplexer further comprises an array of output optical structures having at least one output element, said at least one output element transmitting an output beam. The array of output optical structures can comprise optical waveguides, or miniature free-space optical elements. The array of output optical structures can comprise at least one material selected from the group consisting of silicon, silicon monoxide, silicon dioxide, silicon-germanium alloys, silicon carbide, silicon nitride, and indium phosphide.

The demulitplexer can further comprise an optical waveguide that communicates the output beam from said output element to a photodiode.

In one embodiment, each color comprises a narrow band of wavelengths centered on a primary wavelength, which can be designated by the International Telecommunications Union as one of a set of discrete wavelengths to be utilized for optical telecommunications.

In some embodiments, the wavelength dispersive optical element is a selected one of a prism, a grating, or a grism. In some embodiments, the wavelength filter array is a selected one of an array of interference filters, an array of waveguide Bragg gratings, an array of Fabry-Perot interferometers, an array of resonantly-coupled waveguide structures, or an array of waveguide ring resonators.

In another aspect, the invention relates to a method of demultiplexing an optical beam having a plurality of spatially overlapping colors. The method comprises providing an assembly of miniature optical elements, the assembly comprising a monolithic substrate, a wavelength dispersive optical element fabricated on said monolithic substrate, and a wavelength filter array fabricated on said monolithic substrate. In addition, the method comprises receiving an input beam having a plurality of spatially overlapping distinct colors, dispersing the input beam, by use of the wavelength dispersive optical element, into a plurality of spatially-separated substantially single color optical beams, each beam containing primarily a single color that is different than the color of the other substantially single color optical beams, and filtering said at least one of the substantially single-color optical beams and removing therefrom colors other than the designated primary color of that beam, thereby providing at least one purified single-color output beam, said output beam being substantially free of other colors.

In some embodiments, the input beam is received from an optical waveguide external to said assembly. In some embodiments, the output beam is transmitted to an optical waveguide external to said assembly.

In yet another aspect, the invention features a method of fabricating a miniature monolithic optical demultiplexer. The method comprises utilizing semiconductor fabrication methods to create a wavelength dispersive element and an array of wavelength filtering elements upon a monolithic substrate, the combination of the wavelength dispersive element and the array of wavelength filtering elements providing a miniature monolithic optical demultiplexer. In some embodiments, the wavelength dispersive optical element and the wavelength filter array are formed by semiconductor fabrication processes. In some embodiments, the method further comprises fabricating an input optical structure by semiconductor fabrication processes. In some embodiments, the method further comprises fabricating an output optical structure by semiconductor fabrication processes.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

An ideal demultiplexer will direct all of the incoming light of each color onto its corresponding output optical fiber. The fraction of light of each color that is not successfully transmitted into its corresponding output beam is called the insertion loss, and is usually expressed in units of dB. The fraction of the light power from neighboring colors that remain in the separated beams in addition to the primary wavelength is called the crosstalk, also usually expressed in dB. Desirable characteristics for telecommunications demultiplexers include insertion loss of less than 3 dB, and crosstalk of less than approximately −40 dB. Furthermore, it is desirable to achieve these characteristics in devices that are compact in size, resistant to effects of the external environment, and easy to manufacture in large quantities at low cost. Calculations presented below show that to achieve the crosstalk specification by using a simple diffraction grating to separate colors, the grating must be more than 3 cm wide, a size which is not amenable to low-cost mass production.

In contrast, it is shown below that the combination of a grating and a simple wavelength filter enables reduction of the grating size, and the sizes of the associated optical components, to less than 2 mm wide and a fraction of a mm deep. Components of these sizes are amenable to manufacture by etching of silicon or other materials, enabling the use of mature semiconductor micromachining manufacturing techniques, which leads to scalable mass production.

Furthermore, by shrinking the optical elements to the size of the optical fibers, and manufacturing them collectively as an "optical bench on a chip" or as an integrated waveguide structure, the difficulties associated with macroscopic components, such as assembly and alignment, are eliminated. Stability is improved because movement, due to thermal expansion or mechanical vibration, of optical elements relative to fiber core positions is reduced in proportion to the size of the optical elements. In addition, monolithic structures effectively eliminate the possibility of misalignment caused by the relative translational and/or rotational motion of components, because a single substrate significantly reduces such motion. Insertion loss is reduced by increasing the efficiency of coupling light in and out of optical fibers with miniature optical elements.

Grating Basics

Figure 1:
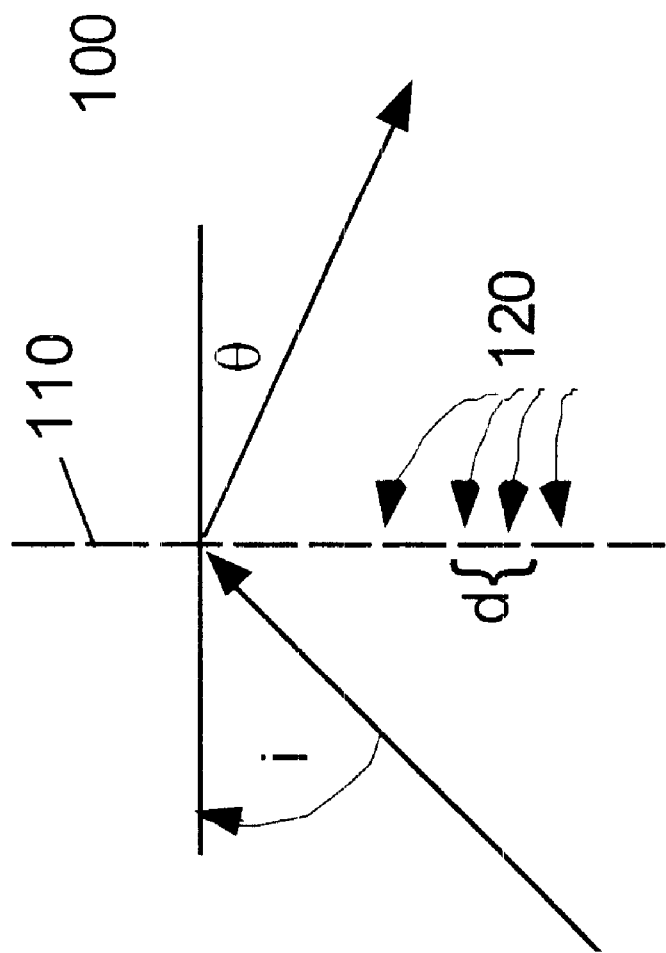
FIG. 1 shows a basic diffraction grating configuration known in the prior art.

FIG. 1 shows a basic diffraction grating configuration 100. It is essentially a transmissive or reflective optical element 110 upon which a series of equally spaced linear grooves or lines 120 are cut. The spacing between lines is called the grating period. The diffraction angle, θ, the incident angle, i, the grating period, d, and the wavelength of the light, λ, are related by $$d(\sin i + \sin \theta) = m\lambda \tag{1}$$

where m is an integer called the diffraction order.

The angular dispersion, δθ, between beams of different wavelengths emerging from this grating is given by $$\delta\theta = \delta\lambda/(d \cos \theta) \tag{2}$$

where δλ is the wavelength separation between input wavelengths. For ITU grid wavelengths, the channel separation in terms of frequency is 100 GHz, which in terms of wavelength corresponds to about δλ=0.8 nm and δθ=1.28 mrad. Like any optical element, the grating does not produce a perfect single output "beam" at each wavelength. The output is actually a diffraction pattern consisting, for each wavelength, of a principal peak and multiple relatively weak sidelobes. The angular half width of the principal peak, Δθ, which is the same as the approximate angular spacing between sidelobes, is given by $$\Delta\theta = \lambda/(Nd \cos \theta) \tag{3}$$

where N is the number of grating lines intercepted by the incident beam (and therefore Nd is the size of the incident beam). Note that, for a simple grating, the relative amplitudes of the sidelobes are independent of the grating period and incident beam size.

Figure 2:
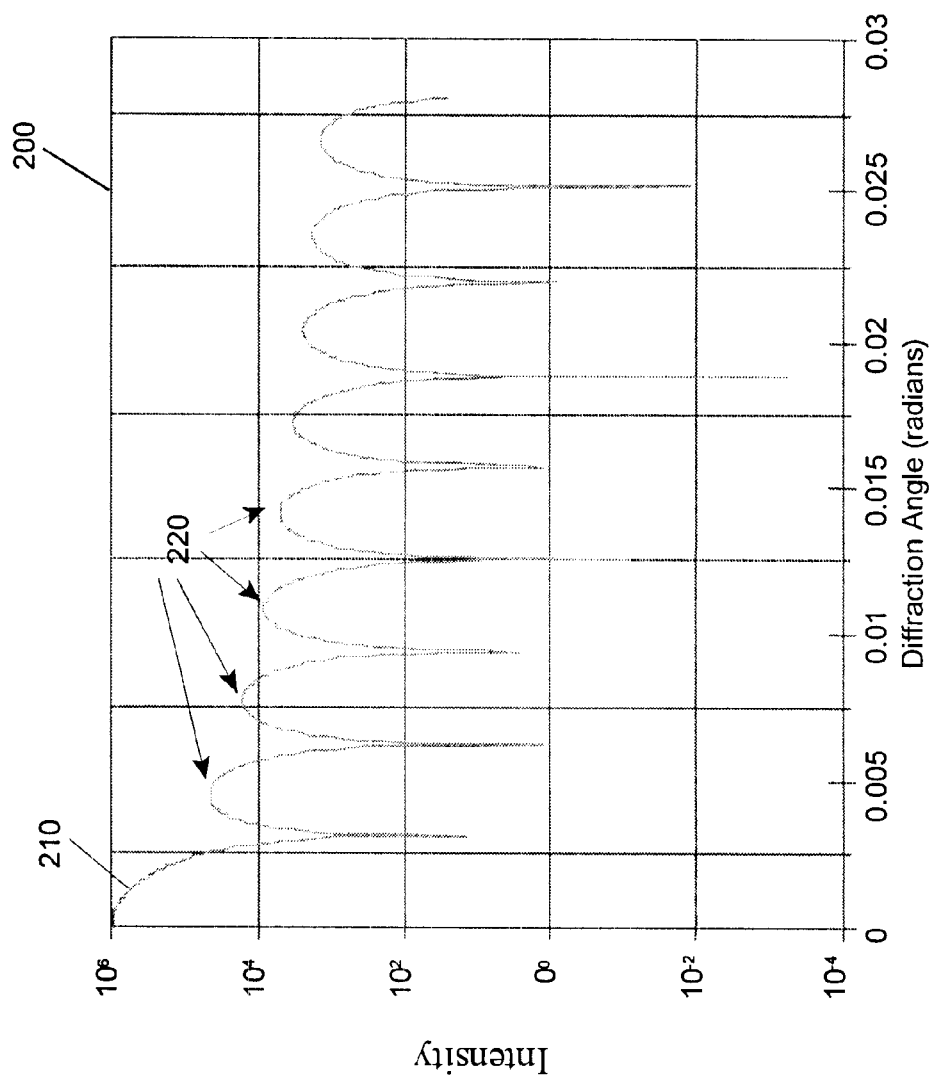
FIG. 2 shows a diagram that depicts a 1000 slit grating diffraction pattern.

The intensity pattern 200 for the diffracted beam created by the basic grating 100 is shown in FIG. 2. Only first order, m=1, is considered. A wavelength of λ=1550 nm, corresponding to the optical telecommunications band, is used. A line spacing of 1000 lines/mm has been selected, but closer spacing can be used. FIG. 2 shows how the power of each sidelobe 220 decreases the farther away it is from the principal peak 210. For example, the third sidelobe is 20 dB weaker than the principal peak.

Crosstalk and Insertion Loss for Macro-Gratings

Crosstalk and insertion loss arise from the use of a grating when any portion of the diffraction pattern from one wavelength overlaps the patterns of its neighbors. Because diffraction patterns are essentially infinitely wide, it is impossible to have zero crosstalk and insertion loss—it is practical only to set limits on their magnitudes. For example, if the grating is designed so that none of the principal peak or the first four sidelobes can spatially overlap the neighboring wavelength, then crosstalk is limited to about −17 dB. This constraint requires 8Δθ=δθ. For the 1000 line/mm grating and 100 GHz channel spacing, this constraint requires Nd, the size of the beam where it intercepts the grating and thus the minimum grating size, to be 16 mm. To accommodate closer channel spacings or reduced crosstalk, a larger grating and incident beam would be required. It is notable that crosstalk of −40 dB, the telecom requirement, is not achieved even with a 30 mm grating size.

The insertion loss is determined by the amount of light contained in the remaining sidelobes that do overlap neighbors. If there is less than −20 dB (1%) crosstalk between one wavelength and each of its two neighbors, then the throughput is 98% corresponding to an insertion loss of less than 0.1 dB. In practice, it is impractical to have more than 90% of the light incident on the grating emerge in the first grating order—the remainder is lost to higher orders. This increases the practical insertion loss to about 0.5 dB.

Miniaturization

Figure 3:
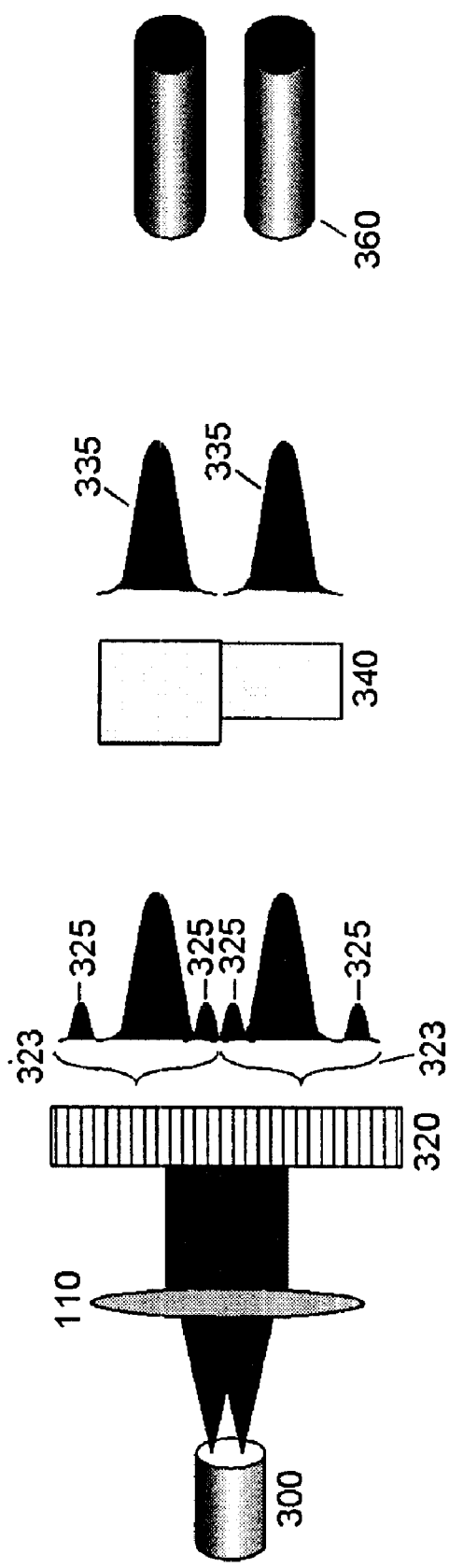
FIG. 3 shows a schematic diagram of an embodiment of a grating that spatially separates or disperses colors input from an optical fiber, and a filter array that purifies the colors of the dispersed beams, according to the invention.

By combining a grating with wavelength filters that block grating-induced sidelobes, the size of the grating can be reduced to 1–2 mm while achieving −40 dB crosstalk and less than 3 dB insertion loss. This combination enables mass production by manufacturing techniques similar to those utilized in the semiconductor industry. The functionality of this combination is illustrated in FIG. 3, in which a grating 320 spatially separates or disperses wavelengths input from an optical fiber 300, and a filter array 340 removes side lobes 325 from the multiple beams of light 323 emanating from the grating 320. Output fibers 360 collect the individual beams 335 free of crosstalk from neighboring beams. All components are of the same size scale as the optical fibers 300, 360.

Figure 4:
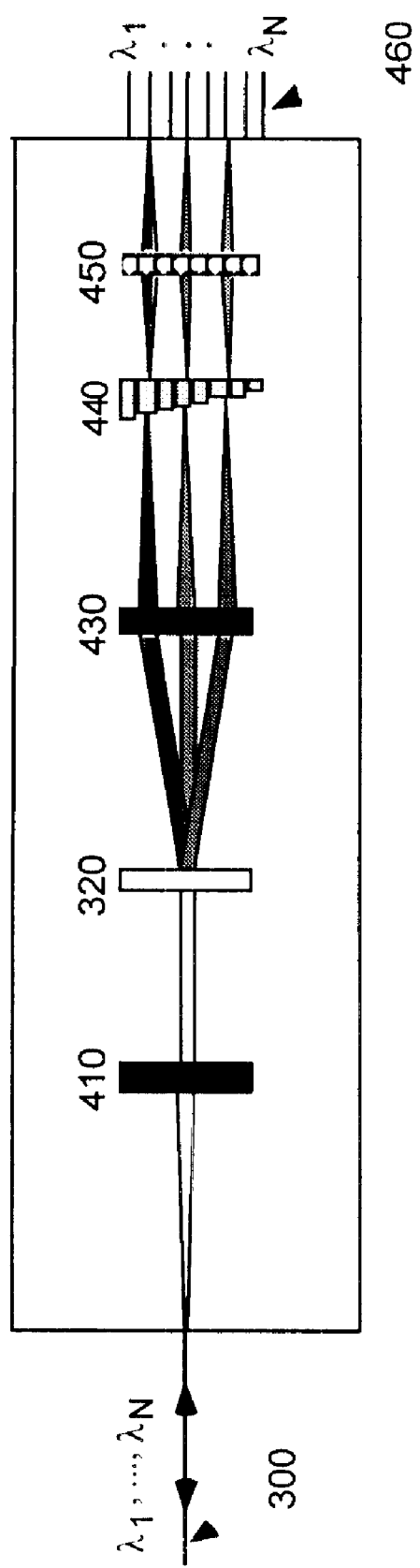
FIG. 4 shows a schematic diagram of an embodiment of an exemplary DWDM demultiplexer using a combination of a wavelength dispersive grating and an optical filter array, according to the invention.

One exemplary embodiment of a demultiplexer utilizing this concept of grating and wavelength filters is illustrated by FIG. 4. In operation, the optical assembly accepts laser light from an optical fiber 300, collimates the light with a lens 410, and spatially separates the colors by dispersion with a grating 320. It then focuses the individual colors of light with lens 430 upon a linear array of Fabry-Perot Interferometers (FPIs) 440, each designed to pass only a specific frequency of the International Telecommunications Union (ITU) grid. The demultiplexed light beams are then refocused with a lens array 450 into an array of output optical fibers 460.

Each FPI shown in FIG. 4 is basically a pair of partially reflecting parallel mirrors that form an optical cavity. Interference by the multiple reflections from each mirror surface determines the transmittance and reflectance of the cavity. When the spacing between mirror elements is equal to an integral multiple of half the wavelength of the incident light, then the cavity becomes perfectly transmissive, regardless of individual mirror reflectance (and ignoring absorption by the mirrors).

Mathematically, the cavity transmission is described by the following function:

$$I_t/I_o = [1 - A/(1-R)]^2/[1 + F \sin^2(\delta/2)] \tag{4}$$

where $I_o$ = incident power
$I_t/I_o$ = transmittance or throughput
$F = 4R/(1-R)^2$
$R$ = mirror reflectance
$A$ = mirror absorbance
$\delta = 4\pi n l/\lambda$
$l$ = cavity spacing
$\lambda$ = wavelength of incident light
$n$ = index of refraction of cavity medium at wavelength $\lambda$.

Figure 5:
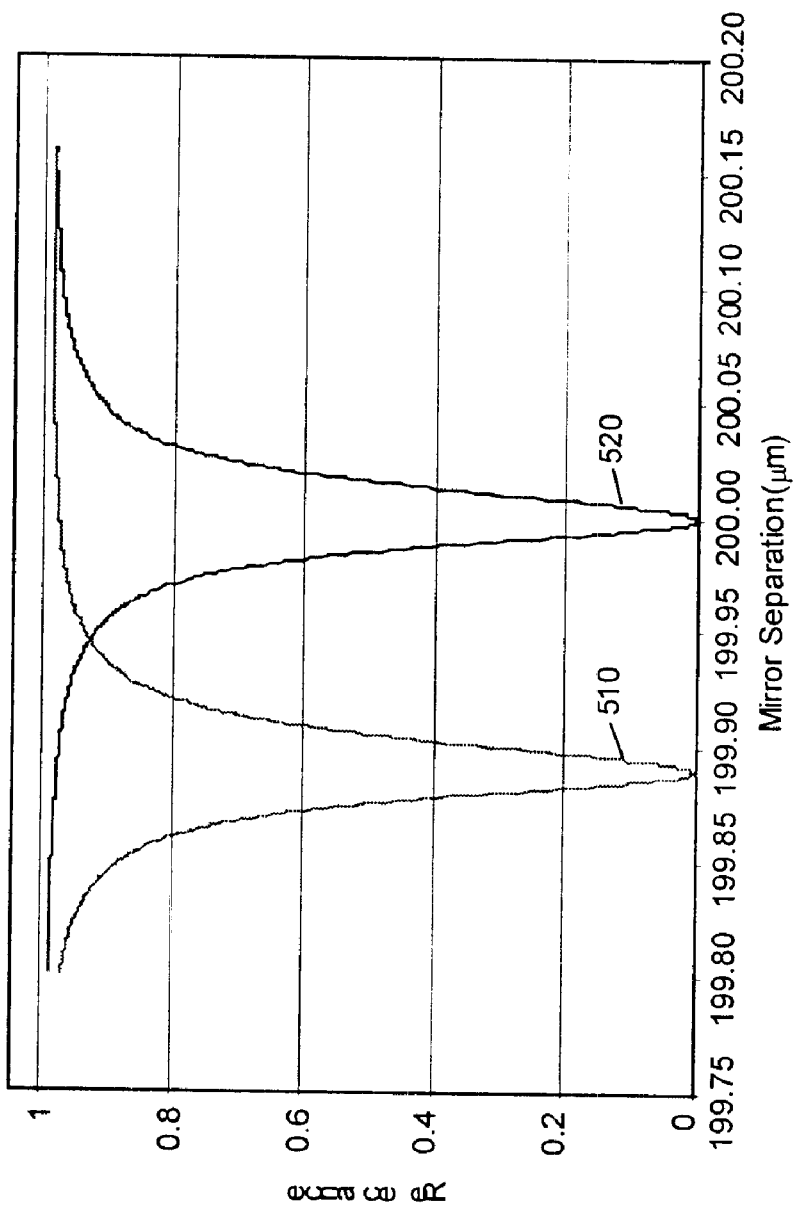
FIG. 5 shows a diagram that depicts the reflectance versus mirror separation for a Fabry-Perot etalon at two neighboring ITU wavelengths.

FIG. 5 shows the reflectance as a function of mirror separation near $l=200$ μm of an FPI having R=0.8, A=0. When A=0, the reflectance plus transmittance of the interferometer equals unity. Note that the reflectance of the interferometer is distinct from the reflectance R of each individual mirror. Curves 510, 520 for two neighboring wavelengths, near 1.5 μm and separated by 100 GHz are shown. The calculations show that, with a mirror spacing of 200 μm, one wavelength is fully transmitted while less than 2% of the neighboring grid wavelength is transmitted. If A is increased to the reasonable value of 0.005, then the transmittance decreases to about 95%. Therefore, this filter provides an additional −17 dB of crosstalk reduction with only 0.2 dB of insertion loss. By increasing R to 0.9, additional crosstalk reduction increases to nearly −23 dB while insertion loss increases to about 0.45 dB.

By combining an FPI array with a diffraction grating, the spatial separation between adjacent wavelengths at the demultiplexer's output can be reduced to the width of the principal diffraction peak, using the FPI to reject sidelobes to achieve the optical telecommunication crosstalk specification. Therefore, the angular width of the principal peak can be increased to equal the angular dispersion between wavelengths, permitting reduction in the width of the diffraction grating. For 100 GHz wavelength separation, a 2 mm grating will suffice (at 1000 lines/mm), while 4 mm is needed to accommodate 50 GHz spacing. Then, approximately 3% of each wavelength will spill over to each of its neighbors, yielding about 0.3 dB of insertion loss and −15 dB of crosstalk prior to, or in the absence of, the FPI. Assuming that the FPI provides crosstalk rejection of −23 dB, total crosstalk is less than −38 dB, or approximately the required level. Total insertion loss due to the grating, including losses to sidelobes and higher orders, is expected to be about 0.8 dB (83% throughput), and loss due to the FPI will be less than 0.5 dB. Total insertion loss is therefore expected to be less than 1.5 dB.

It is clear that the wavelength filters utilized in the demultiplexer of FIG. 4 need not be an ITU grid FPI array. The array of filters may alternatively be constructed using ITU grid interference filters coated onto the ends of the optical fiber array, or by using an array of fiber Bragg gratings, or by any other functionally equivalent filtering technique. Regardless of the construction style, each optical filter is manufactured or tuned to transmit a portion of the wavelength of light delivered to it from the grating and to block nearly all of the light from neighboring wavelengths.

Manufacturing

The exemplary optical elements shown in FIG. 4, including the lenses, grating, and the filters, may be manufactured as miniature components on a monolithic silicon or indium phosphide substrate. The components may be microelectromechanical (MEMS) devices, or may be constructed in the form of optical waveguides, or a combination thereof. The techniques for manufacturing the devices are derived from and similar to the techniques utilized to manufacture semiconductor electronic components. These manufacturing methods can involve (i) photolithographic methods using electromagnetic radiation or charged particle beams for defining devices, features, objects, areas and regions, (ii) methods of removing material selectively, such as chemical etching, plasma-etching, ion milling, and mechanical cutting or grooving, and (iii) methods of depositing materials, such as chemical vapor deposition, evaporation, ion implantation, plasma deposition and plasma-driven reactions, and solidifying liquids. The materials of fabrication that can be used include silicon, in single crystal and polycrystalline forms, and indium phosphide, as well as selected impurity materials that can impart desired electrical, optical or mechanical properties to silicon or to indium phosphide. Examples of materials that can be employed include (i) electrically active dopants such as boron and phosphorus that can be used to control the electrical, optical and semiconducor properties of the silicon, and dopants such as elements from columns II and VI of the periodic table which can be used to modify the properties of indium phosphide, (ii) elements such as oxygen that can be used to form insulators and chemically unreactive materials such as silicon dioxide when combined with silicon, and (iii) elements such as carbon and nitrogen that can be used to form materials such as silicon carbide and silicon nitride that can provide useful properties such as hardness, specific electronic properties, and chemically unreactive layers. Materials that can be deposited on silicon or on indium phosphide, such as other semiconductors, electrical conductors for making connections between devices or to external circuitry, and optical coatings for transporting or controlling light, can all be employed. In addition, circuit elements and devices for generating, detecting, communicating, and processing signals, and for controlling any movable mechanical features of the device can be fabricated on or within the silicon, or the indium phosphide.

Figure 6:
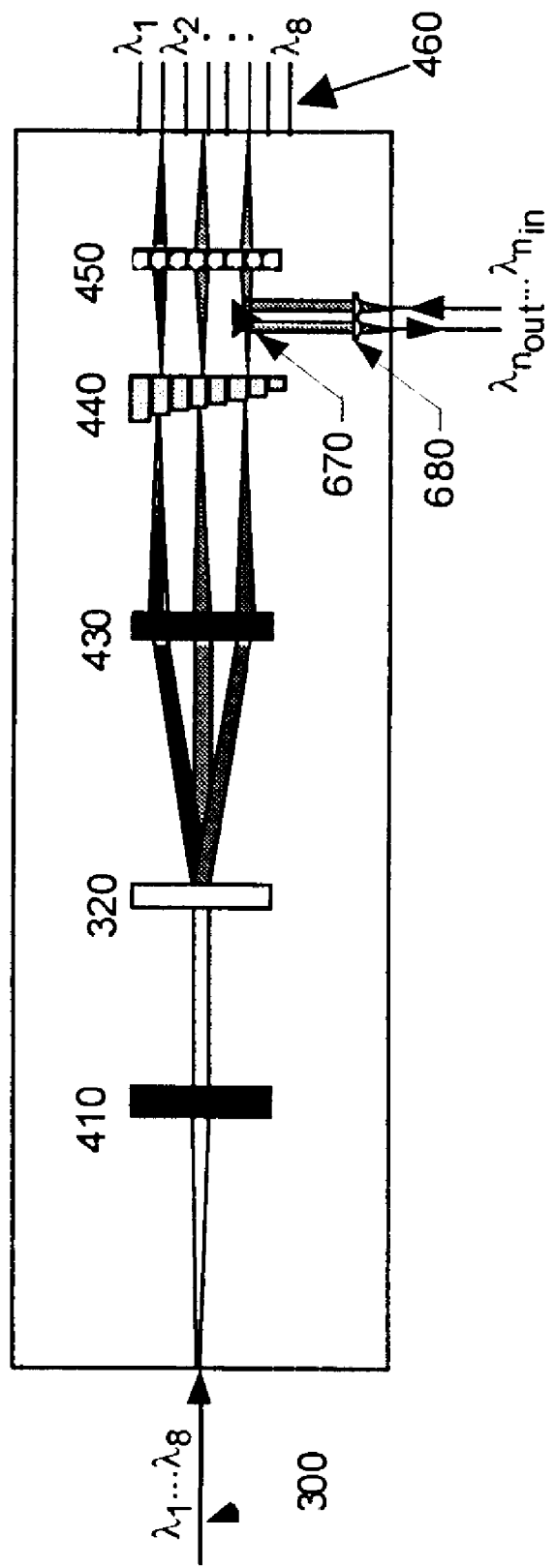
FIG. 6 shows a schematic diagram that depicts an embodiment of an exemplary optical add drop multiplexer, according to the invention.

A miniature wavelength demultiplexer suitable for optical telecommunication applications and manufacturable by scalable semiconductor microfabrication techniques has been described. The combination of wavelength dispersion and optical filtering has been shown to provide acceptable insertion loss and crosstalk in a miniature footprint. Utilized in reverse, this device can be used as a multiplexer. By adding mirrors 670 and lenses 680 to the monolithic device as shown in FIG. 6, an add-drop multiplexer is created. By adding electro-mechanical components that cause mirrors to move into or out of the optical paths in response to control signals, reconfigurable versions of these devices are enabled. As disclosed in one or more of the earlier applications mention above and incorporated herein by reference, addition of other components, such as a two-dimensional array of mirrors, can provide functionality for devices such as n×n optical switches. Each of these devices is needed in the rapidly growing optical telecom network, and the optical configuration of the demultiplexer disclosed herein enables their development.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A miniature monolithic optical demultiplexer, comprising:
    a monolithic substrate;
    a wavelength dispersive optical element fabricated on said monolithic substrate, said wavelength dispersive optical element receiving an input beam having a plurality of spatially overlapping distinct colors and providing an output signal composed of a plurality of spatially separated substantially single-color beams, each substantially single-color beam having a primary wavelength that is different than the primary wavelengths of the other substantially single-color beams; and
    a wavelength filter array fabricated on said monolithic substrate and having at least one filter element, said at least one filter element receiving a selected one of said plurality of spatially separated substantially single-color optical beams and removing therefrom any portions of beams of other primary wavelengths that were separated incompletely from the selected beam by the wavelength dispersive optical element, thereby providing a purified single-color output beam substantially free of colors associated with other primary wavelengths.

2. The miniature monolithic optical demultiplexer of claim 1, further comprising an input optical structure that receives the input beam.

3. The miniature monolithic optical demultiplexer of claim 2, wherein the input optical structure comprises at least one material selected from the group consisting of silicon, silicon monoxide, silicon dioxide, silicon-germanium alloys, silicon carbide, silicon nitride, and indium phosphide.

4. The miniature monolithic optical demultiplexer of claim 2, wherein the input optical structure comprises an optical waveguide.

5. The miniature monolithic optical demultiplexer of claim 2 wherein the input optical structure comprises a miniature free-space optical element.

6. The miniature monolithic optical demultiplexer of claim 2, further comprising an optical waveguide that communicates the input beam from an external source.

7. The miniature monolithic optical demultiplexer of claim 1, further comprising an array of output optical structures having at least one output element, said at least one output element transmitting an output beam.

8. The miniature monolithic optical demultiplexer of claim 7, wherein the array of output optical structures comprise at least one material selected from the group consisting of silicon, silicon monoxide, silicon dioxide, silicon-germanium alloys, silicon carbide, silicon nitride, and indium phosphide.

9. The miniature monolithic optical demultiplexer of claim 7, wherein the array of output optical structures comprise optical waveguides.

10. The miniature monolithic optical demultiplexer of claim 7, wherein the array of output optical structures comprise miniature free-space optical elements.

11. The miniature monolithic optical demultiplexer of claim 7, further comprising an optical waveguide that communicates said output beam from said output element to an external receiver.

12. The miniature optical demultiplexer claim 1, wherein the substrate comprises at least one material selected from the group consisting of silicon, silicon monoxide, silicon dioxide, silicon-germanium alloys, silicon carbide, silicon nitride, and indium phosphide.

13. The miniature monolithic optical demultiplexer of claim 12, wherein the substrate comprises a material that is amenable to processing using semiconductor fabrication processes.

14. The miniature monolithic optical demultiplexer of claim 1, wherein at least one of the wavelength dispersive optical element and the wavelength filter array comprises at least one material selected from the group consisting of silicon, silicon monoxide, silicon dioxide, silicon-germanium alloys, silicon carbide, silicon nitride, and indium phosphide.

15. The miniature monolithic optical demultiplexer of claim 1, wherein at least one of the wavelength dispersive optical element and the wavelength filter array elements comprises an optical waveguide.

16. The miniature monolithic optical demulitplexer of claim 1, wherein at least one of the wavelength dispersive optical element and the wavelength filter array elements comprises a miniature free-space optical element.

17. The miniature monolithic optical demultiplexer of claim 1, wherein each color comprises a narrow band of wavelengths centered on a primary wavelength.

18. The miniature monolithic optical demultiplexer of claim 17, wherein each primary wavelength is designated by the International Telecommunications Union as one of a set of discrete wavelengths to be utilized for optical telecommunications.

19. The miniature monolithic optical demultiplexer of claim 1, wherein the wavelength dispersive optical element is a selected one of a prism, a grating, or a grism.

20. The miniature monolithic optical demultiplexer of claim 1, wherein the wavelength filter array is a selected one of an array of interference filters, an array of waveguide Bragg gratings, an array of Fabry-Perot interferometers, an array of resonantly-coupled waveguide structures, or an array of waveguide ring resonators.

21. A method of demultiplexing an optical beam having a plurality of spatially overlapping colors, comprising the steps of:

providing an assembly of miniature optical elements, comprising:
  a monolithic substrate;
  a wavelength dispersive optical element fabricated on said monolithic substrate; and
  a wavelength filter array fabricated on said monolithic substrate;
receiving an input beam having a plurality of spatially overlapping distinct colors;
dispersing the input beam, by use of the wavelength dispersive optical element, into a plurality of spatially-separated substantially single color optical beams, each beam containing primarily a single color that is different than the color of the other substantially single color optical beams; and
filtering said at least one of the substantially single-color optical beams and removing therefrom colors other than the designated primary color of that beam, thereby providing at least one purified single-color output beam, said output beam being substantially free of other colors.

22. The method of claim 21, wherein the input beam is received from an optical waveguide external to said assembly.

23. The method of claim 21, wherein the output beam is transmitted to an optical waveguide external to said assembly.

24. A method of fabricating a miniature monolithic optical demultiplexer comprising the step of:
  utilizing semiconductor fabrication methods to create a wavelength dispersive element and an array of wavelength filtering elements upon a monolithic substrate, the combination of the wavelength dispersive element and the array of wavelength filtering elements providing a miniature monolithic optical demultiplexer.

25. The fabrication method of claim 24, wherein the wavelength dispersive optical element and the wavelength filter array are formed by semiconductor fabrication processes.

26. The fabrication method of claim 24, further comprising the step of fabricating an input optical structure by semiconductor fabrication processes.

27. The fabrication method of claim 24, further comprising the step of fabricating an output optical structure by semiconductor fabrication processes.

* * * * *